United States Patent
Raghav et al.

(10) Patent No.: US 10,146,417 B2
(45) Date of Patent: Dec. 4, 2018

(54) CROWD-SOURCED SETTINGS AND TOOLS FOR DOCUMENT INTERACTION

(71) Applicant: Adobe Systems Incorporated, San Jose, CA (US)

(72) Inventors: Sankalp Raghav, Moradabad (IN); Tanvi Rastogi, Lucknow (IN); Sachin Soni, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 455 days.

(21) Appl. No.: 14/920,578

(22) Filed: Oct. 22, 2015

(65) Prior Publication Data

US 2017/0118261 A1     Apr. 27, 2017

(51) Int. Cl.
| | |
|---|---|
| *G06F 3/0484* | (2013.01) |
| *G06F 9/445* | (2018.01) |
| *G06F 9/451* | (2018.01) |
| *G06Q 50/00* | (2012.01) |

(52) U.S. Cl.
CPC ........ *G06F 3/04847* (2013.01); *G06F 9/4451* (2013.01); *G06F 9/451* (2018.02); *G06F 2203/04806* (2013.01); *G06Q 50/01* (2013.01)

(58) Field of Classification Search
CPC .................. G06F 3/04847; G06F 2203/04806
See application file for complete search history.

(56) References Cited

U.S. PATENT DOCUMENTS

| | | | | |
|---|---|---|---|---|
| 5,420,975 A | * | 5/1995 | Blades | G06F 3/0482 715/811 |
| 5,821,936 A | * | 10/1998 | Shaffer | G06F 3/0482 715/810 |
| 6,266,060 B1 | * | 7/2001 | Roth | G06F 3/0482 715/206 |
| 7,865,841 B2 | * | 1/2011 | Morikawa | G06F 3/0482 706/14 |
| 8,112,715 B2 | * | 2/2012 | Cragun | G06F 17/30699 707/757 |
| 8,805,816 B2 | * | 8/2014 | Kimball | G06F 3/0481 707/710 |
| 9,158,823 B2 | * | 10/2015 | Ospalik | G06F 17/30029 |
| 9,547,692 B2 | * | 1/2017 | Poulsen | G06Q 90/00 |
| 2006/0075019 A1 | * | 4/2006 | Donovan | G06F 17/30867 709/203 |
| 2007/0250936 A1 | * | 10/2007 | Nakamura | H04L 63/105 726/27 |

(Continued)

*Primary Examiner* — Dino Kujundzic
(74) *Attorney, Agent, or Firm* — Wolfe-SBMC

(57) ABSTRACT

A digital medium environment includes a computing device that is configured to use a document viewing application that includes a user interface to enable a user to view a document. A document that has been shared with multiple users is received by the document viewing application. The document viewing application ascertains whether crowd-sourced information exists for the document. The crowd-sourced information pertains to one or more of settings or tools that have been used on the document by the multiple users. If crowd-sourced information exists, the crowd-sourced information is received and automatically applied to the document. If crowd-sourced information does not exist, settings and tools information associated with interaction with the document is collected and transmitted to a service provider.

20 Claims, 7 Drawing Sheets

(56) References Cited

U.S. PATENT DOCUMENTS

| | | | |
|---|---|---|---|
| 2008/0016091 A1* | 1/2008 | Chandra | G06F 17/30884 |
| 2012/0194850 A1* | 8/2012 | K. | G06F 3/1204 |
| | | | 358/1.15 |
| 2012/0215883 A1* | 8/2012 | Noguchi | H04N 1/00347 |
| | | | 709/217 |
| 2014/0033192 A1* | 1/2014 | Lorenz | G06F 9/451 |
| | | | 717/171 |
| 2016/0381204 A1* | 12/2016 | Chandrasekaran | ......... |
| | | | H04M 1/72569 |
| | | | 715/745 |

* cited by examiner

CROWD-SOURCED SETTINGS AND TOOLS FOR DOCUMENT INTERACTION

BACKGROUND

Today, many different types of electronic documents can be shared amongst users by way of a network such as the Internet. For example, a user may choose to send a document to multiple different users so that the users can interact with the document and consume its content. As users interact with a document on their particular devices, they will often interact with the document in a common way, as by choosing the same or similar settings or using the same or similar tools on the document. For example, a group of users to whom a document has been sent may zoom the document, in some manner, for better viewing. This may require each user to take a number of actions such as searching for and finding the zoom functionality or executing the same zoom gesture over and over. Likewise, to employ a tool on a particular document, such as a tool that allows the user to insert a comment, the user may have to navigate through a viewing application's menu structure to find and then use the tool. This increases the complexity of the user's interaction experience. This is particularly the case with small form factor devices where displays have a smaller footprint within which to display content and allow interaction therewith.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In one or more implementations, a digital medium environment includes a computing device that is configured to use a document viewing application that includes a user interface to enable a user to view a document. One or more computer-readable storage media comprise instructions that are stored thereon that, responsive to execution by the computing device, receive, via the document viewing application, a document that has been shared with multiple users. The document viewing application ascertains whether crowd-sourced information exists for the document. The crowd-sourced information pertains to one or more of commonly used settings or tools, e.g., a zoom setting, that have been used on the document by the multiple users. If crowd-sourced information exists, the crowd-sourced information is received and automatically applied to the document, e.g., by automatically zooming the document to the commonly used zoom setting or displaying a toolbar with commonly used tools. If crowd-sourced information does not exist, settings and tools information associated with interaction with the document is collected and transmitted to a service provider.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
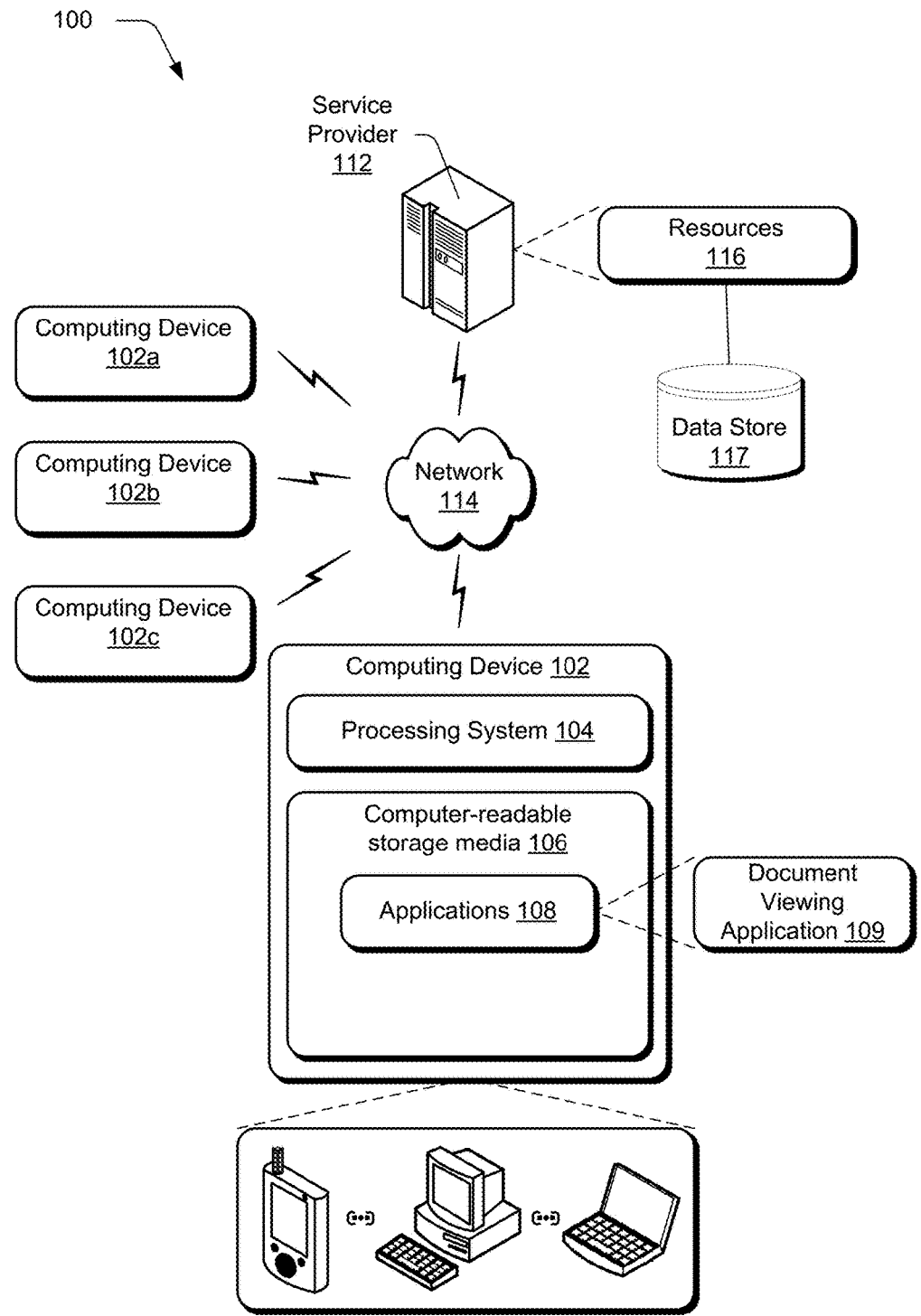
FIG. 1 is an illustration of a digital medium environment in an example implementation that is operable to employ techniques described herein.

The various implementations described below employ crowd-sourced settings and tools to enable users to more efficiently interact with a document that is shared with them. The settings and tools are "crowd-sourced" in the sense that the settings and tools are derived from interaction patterns generated by other users with whom the specific document was shared. That is, as these other users interact with the specific document, their interaction patterns are tracked so that an understanding of which settings and tools are utilized by the users is developed. Once a sufficient understanding has been developed with respect to the interaction patterns, when the document is subsequently shared with other users, the more frequently used settings and tools can be set as defaults for the document.

In some implementations, a third-party service provider tracks interaction patterns of users by receiving information from a document viewing application that is used to interact with a document. This information can be saved by the third-party service provider in a remote data store. Specifically, as a user applies a setting or uses a tool on document or a portion of a document, a communication event can be sent by the document viewing application to the third-party service provider. The communication event includes information associated with a user's interaction pattern. This information can include a document ID that is uniquely associated with a particular document. In addition, the information can further include a page number on which the interaction took place and a content type that was the subject of the interaction. For example, the communication event might indicate that on page 10, text was copied using the copy tool. This enables the third-party service provider to track interaction patterns on a document-by-document basis. In addition, the communication event can include information associated with the device on which the interaction pattern took place. This device-specific information can include such things as the device name, model, size, screen resolution, and the like. This enables the third-party service provider to track device-specific interaction patterns on a document-by-document basis. This also enables the third-party service provider to analyze interaction patterns across devices that are similar. For example, the interaction patterns across similar form-factor devices can be ascertained even though the devices might be from different manufacturers.

This is advantageous because interaction patterns for similar devices may share common characteristics which can be readily identified and used. For example, it might be noted that for a particular document, small form-factor devices from a variety of different manufacturers tend to use a zoom factor of 2×, while larger form factor devices do not use zoom at all.

Once the information associated with interaction patterns has been collected and analyzed, the information can be utilized to set more frequently used settings and tools as defaults for a particular document for particular devices. This can be done in different ways. For example, the third-party service provider may provide or otherwise make use of document sharing services. In this case, the third-party service provider may maintain documents that a user may share with others. The third-party service provider may then include, as part of a document's metadata, information associated with which settings and tools have been used for a particular document for particular devices. When the document is subsequently shared with other users, document viewing applications that are used to consume the document can use the metadata to automatically set default settings and tools for that particular document for the corresponding device. Alternately or additionally, when a user shares a document through a document sharing service, the recipient's document viewing application may use the document ID and its own device characteristics to contact the document sharing service to obtain the crowd-sourced settings and tools information for that particular document for its corresponding device. Once obtained, the crowd-sourced settings and tools information can be used to automatically set default settings for the particular document on the corresponding device.

In the context of this document, a "setting" can be considered as defining a manner in which the user consumes a document. For example, one way in which a user can consume a document is that the user can visually consume the document. Settings associated with visually consuming a document can include, by way of example and not limitation, "rotate view", "page display", "zoom" and the like. Individual settings can also have sub-settings. For example, the "rotate view" has sub-settings of "clockwise", and "counterclockwise". Similarly, the "page display" setting may have sub settings of "single page view", "two page view", and the like.

In the context of this document, a "tool" can be considered as a computer-implemented mechanism that enables the user to interact with or perform a task on the document. For example, tools can include editing tools to enable user to edit the document, commenting tools to enable user to insert comments in the document, protection tools to enable a user to add protections to a document, print tools to enable the user to print the document, and the like. Individual tools can also have sub-tools as well. For example, a commenting tool may have sub-tools that allow for highlighting, underlining, and the like.

In the present context, the term "document" is intended to include, by way of example and not limitation, any type of electronic document in any format. Document formats can include, by way of example and not limitation, *.docx, *.rtf, *.pdf, *.rtf, and the like.

By using crowd-sourced settings and tools as defaults for shared documents, a user is relieved of the burden of having to manually search through what can be a complicated menu structure in order to find the settings and tools. Instead, commonly used settings and tools are automatically presented and made available for the user thereby greatly improving the user's experience. As such, a user can more quickly and efficiently consume a shared document and interact with its content.

In one or more implementations, a digital medium environment includes a computing device that is configured to use a document viewing application that includes a user interface to enable a user to view a document. One or more computer-readable storage media comprise instructions that are stored thereon that, responsive to execution by the computing device, receive, via the document viewing application, a document that has been shared with multiple users. The document viewing application ascertains whether crowd-sourced information exists for the document. The crowd-sourced information pertains to one or more of commonly used settings or tools, e.g., a zoom setting, that have been used on the document by the multiple users. If crowd-sourced information exists, the crowd-sourced information is received and automatically applied to the document, e.g., by automatically zooming the document to the commonly used zoom setting or displaying a toolbar with commonly used tools. If crowd-sourced information does not exist, settings and tools information associated with interaction with the document is collected and transmitted to a service provider.

For example, as recipients receive a particular PDF document, those with small form factor devices tend to zoom the document for better viewing. This interaction pattern may indicate, for example, that these users tend to zoom the document to 2×. Once this interaction pattern has been observed over a threshold number of users, the 2× zoom factor can be automatically set as a default for that particular document. Now, when a subsequent user having a small form factor device receives this document and opens it, the document opens at a 2× zoom factor automatically, without requiring the user to take any action other than opening the document.

Similarly, consider that as recipients receive a particular PDF document, the recipients use a small subset of the tools and sub-tools available for that document. For example, the users may use the comment tool and the edit tool. Once this interaction pattern has been observed over a threshold number of users, the comment tool and the edit tool can be automatically presented to the user upon opening the document. This is particularly helpful in the context of small form-factor devices that have a limited amount of display real estate for displaying tools. This relieves the user of having to hunt through what might be a complicated menu structure in a small device display.

In the following discussion, an example digital medium environment is first described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 including a processing system 104 that may include one or more processing devices, one or more computer-readable storage media 106, and various applications 108 embodied on the computer-readable storage media 106 and operable via the processing system 104 to implement corresponding functionality described herein. In at least some embodiments, applications 108 may include a document viewing application 109. The document viewing application 109 is configured to enable users to receive, view, and interact with documents using one or more of settings or tools, as described above and below.

One example of a document viewing application is a web browser which is operable to access various kinds of web-based resources (e.g., content and services). The applications 108 may also represent a client-side component having integrated functionality operable to access web-based resources (e.g., a network-enabled application), browse the Internet, interact with online providers, and so forth. Other document viewing applications can be utilized without departing from the spirit and scope of the claimed subject matter. For example, a document viewing application may comprise part of a document sharing application in which documents can be shared and interacted with over a network such as the Internet. Applications 108 may further include an operating system for the computing device and other device applications.

The digital medium environment 100 also includes multiple other computing devices 102a, 102b, and 102c. Users of the respective computing devices are able to share documents with one another as will be described in more detail below.

The computing device 102, as well as the other computing devices, may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 6.

The digital medium environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a document sharing service, a photo editing service, a web development and management service, a collaboration service, a social networking service, a messaging service, an advertisement service, and so forth. Content may include various combinations of assets, video comprising part of an asset, ads, audio, multi-media streams, animations, images, web documents, web pages, applications, device applications, and the like.

In one or more implementations, the service provider 112 receives and maintains crowd-sourced information in a data store 117, as described below in more detail. The service provider 112 also uses the crowd-sourced information as described below. For example, when a user of computing device 102 shares a document with the users of computing devices 102a, 102b, and 102c, as the users interact with the document, the service provider 112 collects crowd-sourced information pertaining to which settings and tools were used to interact with the document. That is, as these other users interact with the document, their interaction patterns are tracked so that an understanding of which settings and tools are utilized by the users is developed. Once a sufficient understanding has been developed with respect to the interaction patterns, when the document is subsequently shared with other users, the more frequently used settings and tools can be set as defaults for the document.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example digital medium environment, consider now a discussion of some example details of a document viewing application in accordance with one or more implementations.

In the discussion that follows, a section entitled "Collecting Crowd-Sourced Information" discusses how crowd-sourced information can be collected regarding a document and its user interaction. Following this, a section entitled "Using Crowd-Sourced Information" describes how the collected crowd-sourced information can be utilized. Following that discussion, an "Implementation Example" section provides an example implementation utilizing the principles discussed in the previous two sections.

Collecting Crowd-Sourced Information

Figure 2:
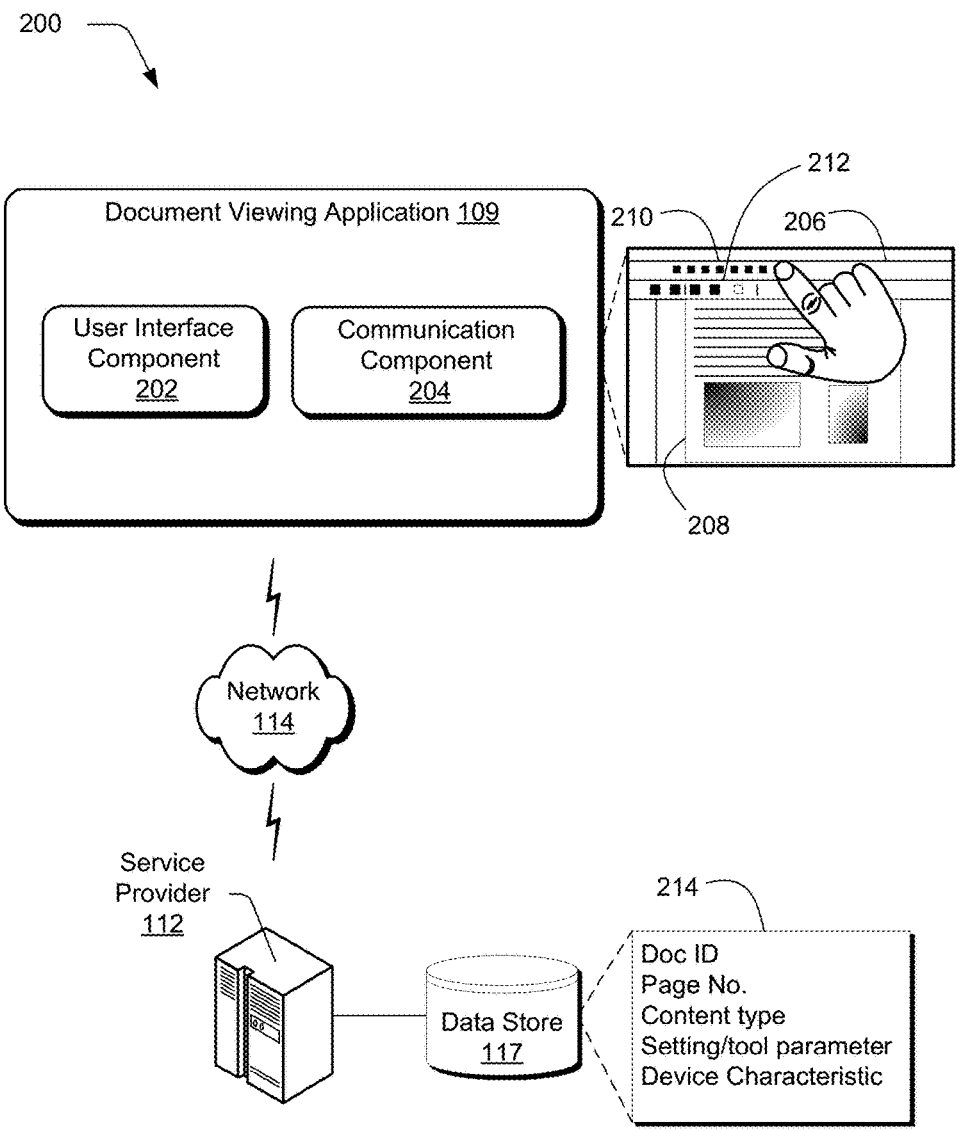
FIG. 2 is an illustration of a digital medium environment in an example implementation that is operable to employ the techniques described herein.

FIG. 2 is an illustration of a digital medium environment 200 that includes the document viewing application 109, service provider 112 and network 114. In this example, the document viewing application 109 includes a user interface component 202 and a communication component 204.

The user interface component 202 is representative of functionality that provides a user interface through which a user can interact with a particular document. So, for example, the user interface component 202 may provide a user interface such as that shown at 206 to enable user to interact with a particular document 208. In this example, the first page of document 208 includes both text and images. Often times, a document viewing application 109 makes its settings and tools available by way of one or more tool bars. In this particular example, two tool bars are shown at 210 and 212 respectively. The various settings and tools are diagrammatically represented by the black and white squares that appear within the tool bars. So, for example, a single black square may represent one setting or tool which may, in turn, have sub-settings or sub-tools that can be used by the user as well. By selecting a particular setting or tool, as indicated by the user's hand, the user can interact with the document and apply a setting or use a tool on document 208. As the user interacts with the document, the document viewing application can make note of the user's interaction pattern, e.g., which tools and settings were used and in relation to which pages and content, as described below.

The communication component 204 is representative of functionality that communicates a user's document interaction pattern to service provider 112. That is, as a user interacts with document 208, the user's interaction pattern is noted and communicated by communication component 204 to the service provider 112 by way of network 114. In one or more implementations, the interaction pattern can be observed and noted at any suitable level of granularity. For example, the interaction pattern can be observed for the document as a whole, for individual pages, for content that appears on individual pages, and the like. That is, a user may interact with one page quite differently than another page. For example, one page may have text only and another page may have mostly images. On the page with text only, the user may select settings and tools that are very different from the settings and tools that are employed on the page having mostly images. Furthermore, with respect to images that appear on the same page, the user may interact with one image differently than another image. For example, the user may use settings and tools for a first image that are different from settings and tools that are selected for a second image. These interaction patterns are observed and communicated to service provider 112.

Any suitable techniques can be utilized to communicate interaction patterns to the service provider 112. For example, when the user applies a setting or uses a tool on a document or a portion of a document, a communication event can be sent by the document viewing application and, more particularly, from the communication component 204 to the service provider 112. Any suitable type of communication event can be utilized such as, by way of example and not limitation, communication event 214.

In this particular example, communication event 214 includes various information associated with a user's interaction pattern. For example, the communication event can include a document ID that identifies a document undergoing the interaction. The communication event can also include the page number and content type. The content type can be identified in any suitable way. For example, in some implementations a document may include markup (e.g., tags) that identifies various content within the document. In other document formats, document metadata may identify content types. For example, on page 10 of a particular document, the user may have interacted with one or more images by using two different tools. In this instance, for page 10, the communication event would include "image" or "image_1" as a content type. The communication event can also include the setting or tool that was utilized as well as a setting or tool parameter. The setting or tool parameter pertains to how the user applied the setting or used the tool and may include a value of some type. So, for example, if the user conducted a zoom operation, the parameter might be "2×". Furthermore, in some implementations a device characteristic can also be provided in the communication event. The device characteristic describes the device that the user used to interact with the document. Device characteristics can include any suitable type of parameters such as, by way of example and not limitation, name, model, size, resolution, and the like. Typically, device characteristics can be obtained using operating system APIs. For example, for Android, the package android.os.BUILD.* can be used. As a user interacts with the document, information associated with the user's interaction pattern can be stored in any suitable data structure that can be used to prepare communication events. As one example, a table such as the one just below might be utilized.

| Document ID | | | |
|---|---|---|---|
| Page Number | Content Type | Setting/Tool | Parameter |
| Document | All | Zoom | 2× |
| Page 1 | Image_0001 | Copy tool | N/A |
| Page 4 | Text; paragraphs 1-2 | Bold | N/A |

Here, a data structure in the form of a table has been created for a particular document identified by "Document ID." As the user interacts with this document, entries can be made in the table to describe the user's interaction pattern. For example, this table includes a column for the page number, the content type, the setting or tool employed, and a parameter if applicable. The setting or tool may be identified in any suitable way such as, by way of example and not limitation, a unique identifier associated with the setting, tool, sub-setting or sub-tool. In this particular example the first entry in the table indicates that the user used a zoom factor of 2× for the entire document. The next entry in the table indicates that on page 1, the user employed the copy tool to copy Image_0001, where "Image_0001" is an identifier for the image. The next entry in the table indicates that on page 4 the user applied boldface font to the text appearing in paragraphs 1-2. It is to be appreciated and understood that the specific entries in the table are for example purposes only and do not necessarily represent the format that data may assume in the table. Rather, other representations may be utilized. The information contained in the table can then be used to prepare communication events to send to the service provider.

As the service provider 112 receives communication events, the communication events are stored in data store 117 for subsequent use and analysis. The communication events can be stored in any suitable type of data structure, an example of which appears in FIG. 2A.

There, an example data structure is shown generally at 250. A data structure is associated with each individual document by way of the document's "Document ID." The data structure can include entries for each device type for which it receives a communication event. A device type can be associated with a specific device by way of a particular specific model number—such as "XYZ-643." Alternately or additionally, a device type can be associated with a range of devices based on device characteristics and properties. For example, devices with form factors falling within a particular range might be considered one device type. Other devices with certain processing characteristics or resources may be considered another device type. For each device type, an entry can be made for the tools that were used on a particular document such as, by way of example and not limitation, through the use of a tools entry that contains individual tool ID entries. The tool ID entry can include information such as the identification of a specific tool and a tool parameter if appropriate. A tool parameter can be used to indicate a value associated with the tool. Likewise, entries can be made for settings that were used on a particular document such as, by way of example and not limitation, through the use of a settings entry that contains individual setting ID entries. The setting ID entry can include information such as the identification of a specific setting and a setting parameter.

Having considered how crowd-sourced information can be collected in one or more implementations, consider now how the crowd-sourced information can be used.

Using Crowd-Sourced Information

Once the crowd-sourced information is collected for a particular document, the crowd-sourced information can be used to automatically set settings and expose tools when a document is shared and opened by a user. As an example, consider FIG. 3.

Figure 3:
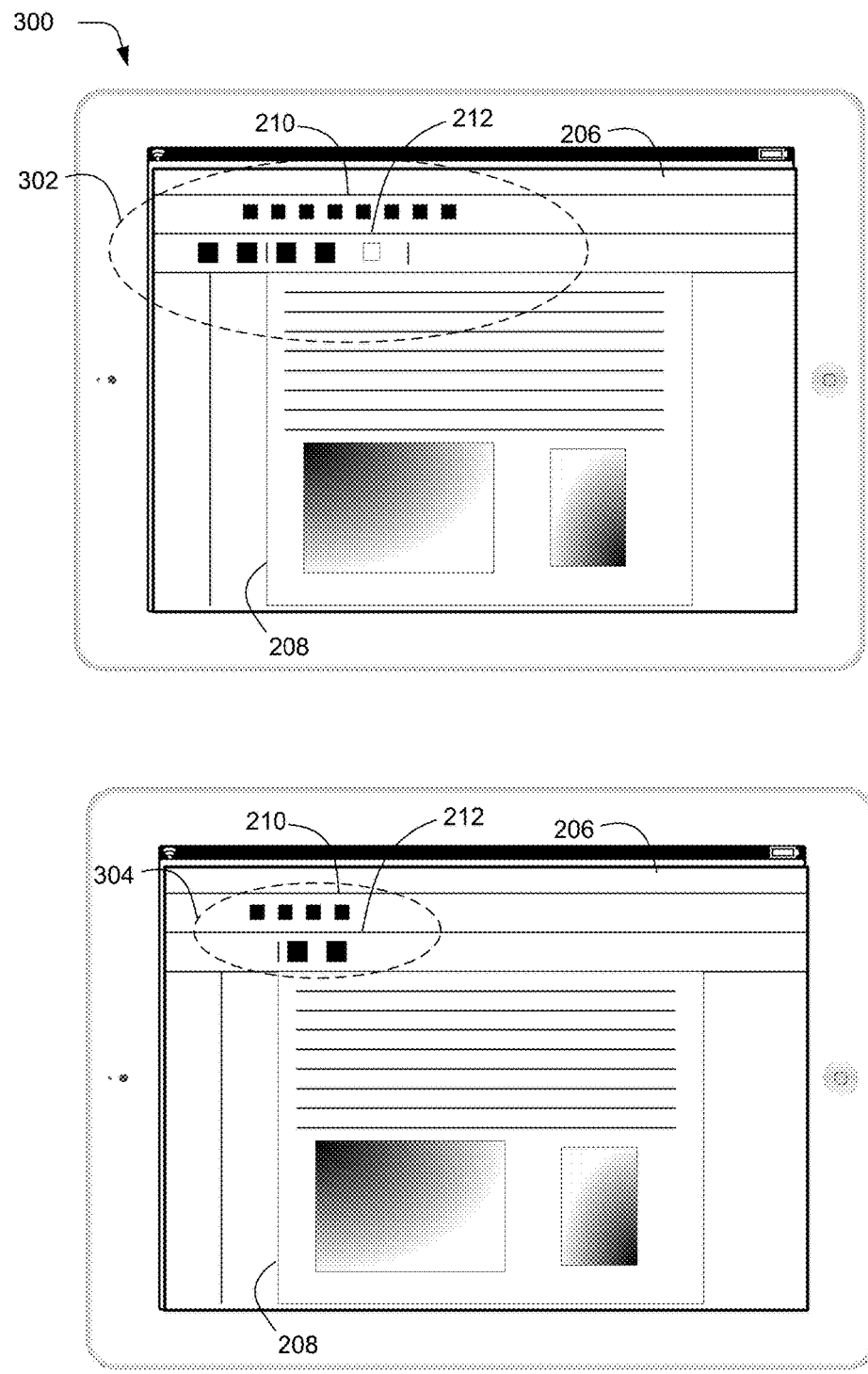
FIG. 3 is an illustration of a digital medium environment including a computing device displaying two different versions of a document.

FIG. 3 illustrates a digital medium environment 300 that includes two computing devices. The topmost computing device illustrates a user interface 206, document 208 and toolbars 210 and 212. Shown within an area 302 are the diagrammatic representations of settings and tools appearing in the toolbars. In the topmost illustration, consider that the diagrammatic representations of the settings and tools are the ones that would normally be presented when a document is opened. These would include, for example, tools and settings which may or may not have been used to interact with the particular document. To this extent, the toolbars can be considered as including a full complement of available settings and tools.

Consider now the bottommost computing device which again illustrates a user interface 206, document 208 and toolbars 210 and 212. Shown within an area 304 is a reduced set of diagrammatic representations of settings and tools appearing in the toolbars. In this instance, the crowd-sourced information has been utilized to reduce the settings and tools that are exposed to the user so that only those that have been identified as germane are exposed. So, for example, the crowd-sourced information has indicated that for this particular document 208, the illustrated tools and settings are the ones that are most used for this document. To determine tools and settings that are most used, a threshold can be defined by the service provider and used to monitor interaction patterns. For example, the service provider may set 75% as a threshold to ascertain a tool or setting that is "most used." Accordingly, if 80 out of 100 users use a particular zoom setting, that zoom setting would qualify as "most used." Alternately or additionally, a consensus type approach can be used. For example, if most users zoom a document but at different levels, a zoom factor that represents a compromise can be selected as a default zoom factor for the document. For example, if 40% of the users zoom to 1.2×, 30% of the users zoom to 1.25×, and 20% of the users zoom to 1.15×, a default zoom factor of 1.2× might be selected, since 90% of the users zoomed the document. For tools, setting a threshold above 50% would address a situation where an equal number of users either use or do not use a tool. For example, at the 75% threshold, if half of the users used the copy tool and half of the users did not use the copy tool, the copy tool might not be exposed to the user. As noted above, this can be applied at the document level, page level, and content level. So, for example, if the user were to select one of the two images, the diagrammatic representations within area 304 might be modified to show only those tools and settings that were indicated by the crowd-sourced information to be germane for that image. Similarly, as the user moves from page to page, the tools and settings that are displayed in the toolbars can dynamically change to reflect those tools and settings that are commonly used on a respective page.

The settings and tools that are automatically exposed to the user, based on the crowd-sourced information, can be exposed in any suitable way using any suitable techniques.

For example, documents that are to be shared may reside in a location that is remote from the user who intends to share the documents. That is, the documents may reside in a cloud environment that is managed by a service provider such as service provider 112. As a document is shared and as various users interact with the document, the crowd-sourced information can be collected and saved as described above. Over time, metadata associated with and comprising part of the document may be provided or modified to indicate which settings and tools are to be exposed when the document is opened. In this manner, the document carries with it its own information regarding which collection of default settings and tools are to be exposed at the document level, page level, and/or content level.

Alternately or additionally, documents that are to be shared may reside locally at a particular user's computing device. When the user opts to share a particular document, he or she may provide the document or a document link to other users. When the user receives the document, the user's document viewing application can contact a suitable service provider, such as service provider 112, and provide the service provider with the document ID and other relevant information such as device type, model, screen size, etc. The service provider can then use the document ID and the other information associated with the user's device to ascertain, from a data structure such as data structure 250 (FIG. 2A), whether there is any crowd-sourced information associated with that particular document and its settings and tools for the specified device. If there is crowd-sourced information which can be used, this information can be communicated back to the document viewing application and applied when the document is opened. So, for example, if a particular page of a document that is received has been zoomed to 3× by many other users having the same or similar form factor device, the zoom information can be communicated to the document viewing application and a default 3× zoom factor can be automatically applied when the user goes to that particular page.

By using crowd-sourced settings and tools as defaults for shared documents, a user is relieved of the burden of having to manually search through what can be a complicated menu structure in order to find the settings and tools. Instead, commonly used settings and tools are automatically presented and made available for the user thereby greatly improving the user's experience. As such, a user can more quickly and efficiently consume a shared document and interact with its content.

Figure 4:
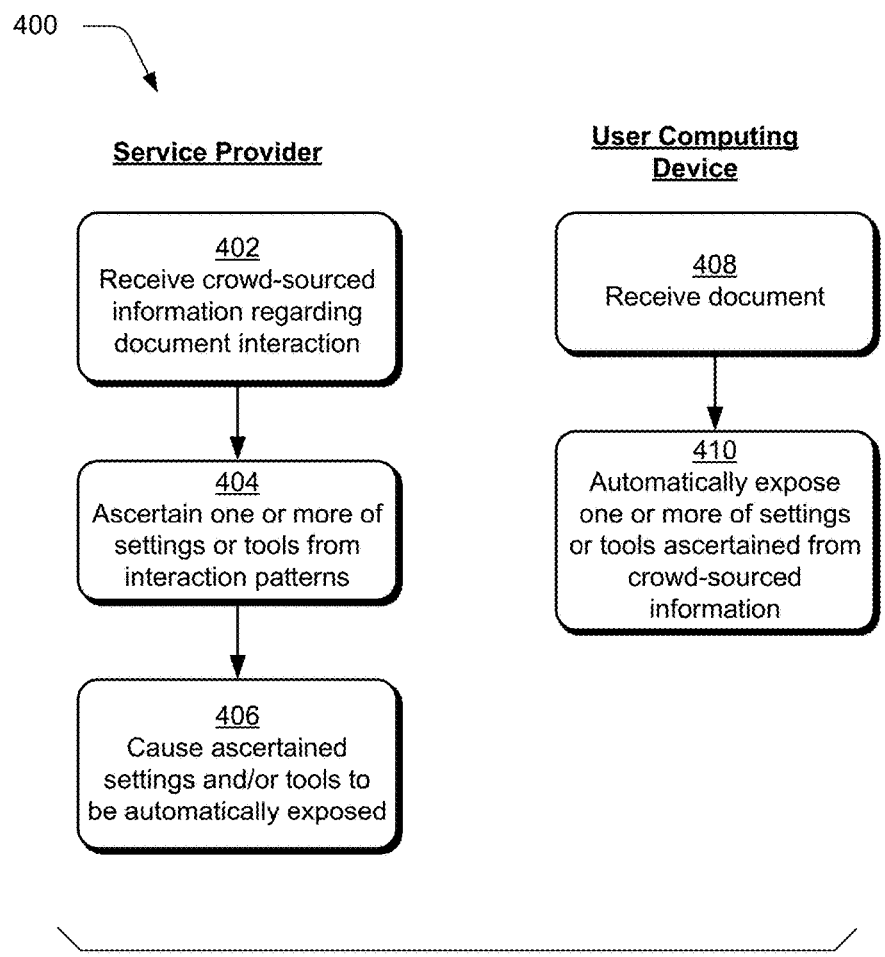
FIG. 4 is a flow diagram depicting an example procedure in accordance with one or more implementations.

FIG. 4 describes example procedures 400 for using crowd-sourced information to automatically expose settings and tools in accordance with one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations, aspects of the procedures may be performed in a digital medium environment by a suitably configured service provider and a suitably-configured user computing device, such as the example computing device 102 of FIG. 1 that makes use of a document viewing application 109, such as that described above. As such, some aspects of the procedures appear under the heading "Service Provider" to depict procedures performed by a service provider. Likewise, some aspects of the procedure appear under the heading "User Computing Device" to depict procedures performed by a user computing device or, more accurately, a document viewing application.

Figure 2A:
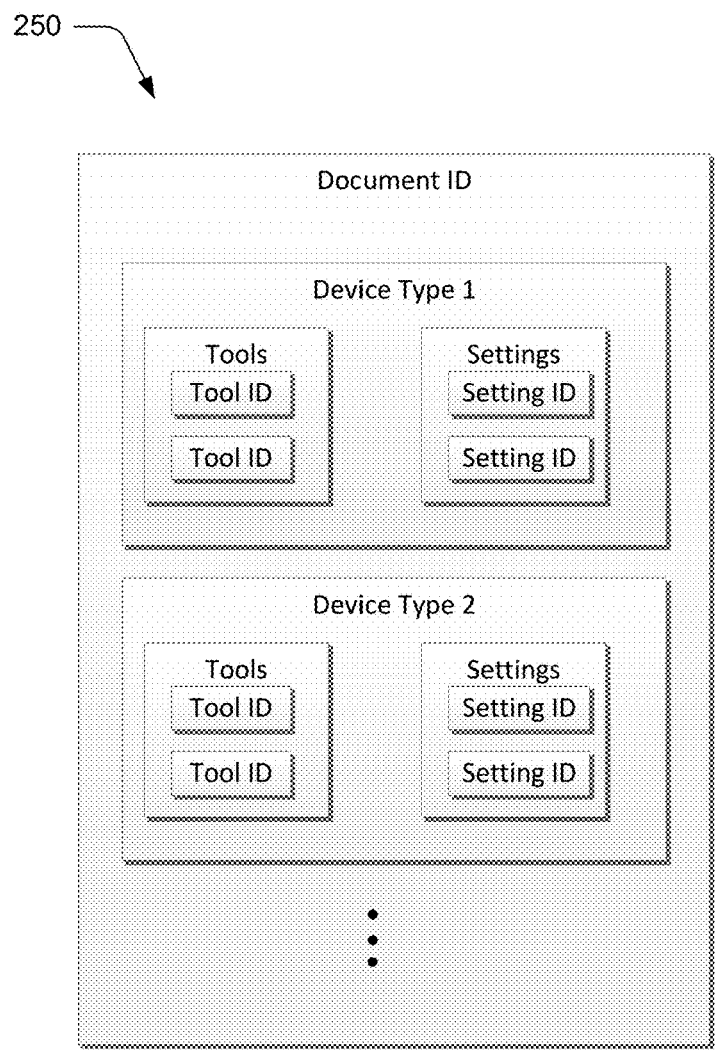
FIG. 2A illustrates an example data structure in accordance with one or more implementations.

Crowd-sourced information regarding document interaction is received (block 402). In some implementations, this procedure is performed by a service provider by way of a network such as the Internet. One or more of settings or tools that are used by other users interacting with a particular document are ascertained from the users' interaction patterns (block 404) and saved in a suitable data structure, such as data structure 250 (FIG. 2A). For example, the settings and/or tools can be ascertained at the document level, page level, and/or content level. The ascertained settings and/or tools can constitute a subset of the settings and tools that are typically presented to a user in a user interface. For example, the ascertained settings and/or tools can constitute commonly used settings and/or tools that are used by a threshold number of users. The service provider then causes the ascertained settings and/or tools to be automatically exposed by way of a document viewing application executing on a user computing device (block 406). This procedure can be performed in any suitable way. For example, in some implementations the service provider may provide an indication of the settings and/or tools in metadata associated with the document itself. Then, when the document is provided to a user computing device, the user computing device has all the information it needs to automatically expose the settings and/or tools. Alternately or additionally, the document may separately be provided to a user computing device which then contacts the service provider to ascertain which settings and/or tools should be automatically exposed. This can include providing a document ID and other relevant information such as device type to the service provider. The service provider can then look up the document based on the document ID and locate settings and tools information based on the device type. The service provider can then communicate, on a document by document basis, the settings and tools that are to be exposed at the document level, page level, and/or content level. This communication can take place separately from communicating the document to the user computing device.

As such, the user computing device receives a document (block 408) and automatically exposes one or more of settings or tools ascertained from crowd-source information (block 410). This procedure can be performed in any suitable way. For example, the user computing device may receive the document and the document may include metadata describes the settings and/or tools are to be automatically exposed on at the document level, page level and/or content level. Alternately or additionally, the user computing device may receive the document and then, responsive to further communication with the service provider, ascertain which settings and/or tools are to be automatically exposed at the document level, page level and/or content level.

Having considered how crowd-sourced information can be collected and used in accordance with various implementations, consider now a specific implementation that can utilize the principles discussed above.

Implementation Example

In some implementations, the inventive principles can be employed in connection with a cloud-based document sharing service. Many different types of document sharing services exist, with one example being Adobe's Send & Track service implemented in connection with Adobe Document Cloud. Using cloud-based document sharing, a user's documents, images, audio, and video files can be securely stored in a cloud-based environment. The user is then provided with an ability to share out their documents with various recipients.

As noted above, any suitable type of settings and tools can be utilized in connection with the inventive principles described herein. In the particular example that follows, a zoom setting is used for context.

In some implementations, the document sharing service can provide document senders with a selectable preference for enabling crowd-sourced information to be collected for a document that they intend to share. The sender can enable this preference for the zoom setting and separately, for the various tools that might be used for a particular document. The recipient can still, however, choose to override the preferences and turn them off so that crowd-sourced information is not collected.

When the sender has enabled these preferences, the recipient's zoom level for a particular document, page, or content, and the tools used on the particular document, page, or content will be tracked in a manner described above. This information is sent to the service provider where it is consolidated across all users or recipients of a particular document.

When the user receives a link or a document that is sent via the cloud-based document sharing service, an application such as a document sharing application or document viewing application contacts the document sharing service to ascertain whether there is any crowd-sourced information corresponding to the document. The crowd-sourced information can be threshold-based where thresholds have been set for a defined number of users. For example, if less than 10 users have provided crowd-sourced information, then it may be considered that no relevant crowd-sourced information exists. On the other hand, if more than 10 users have provided crowd-sourced information, then it may be considered that relevant crowd-sourced information exists. Employing thresholds helps to ensure that meaningful information is collected. Thus, if the crowd-sourced information exists, it can be used to automatically expose settings and tools as described above and below. In this context, when the user opens the particular document, the document will be automatically zoomed to the zoom level identified by the crowd-sourced information. Likewise, popular tools identified by the crowd-sourced information will be automatically exposed to the user.

Figure 5:
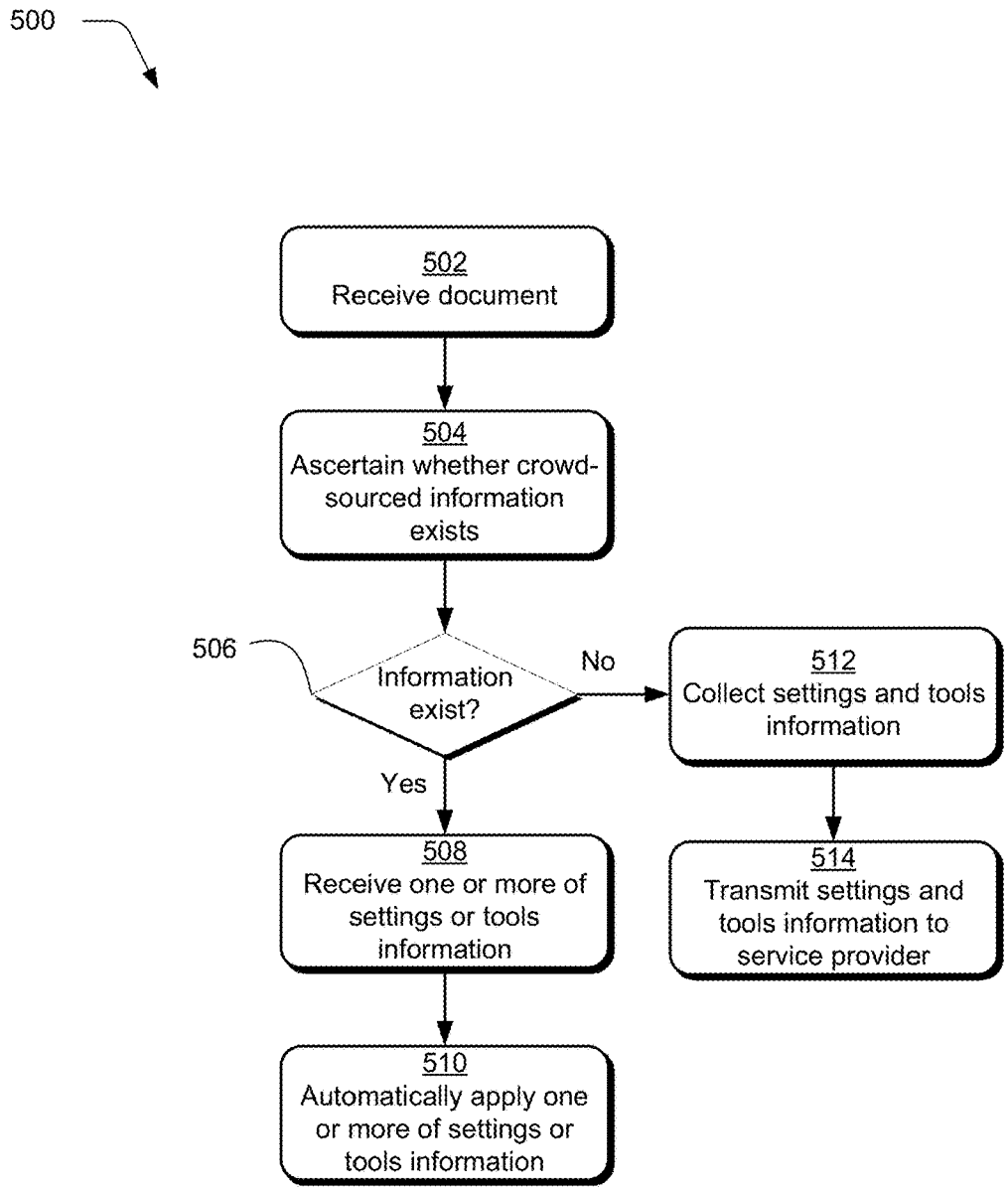
FIG. 5 is a flow diagram depicting an example procedure in accordance with one or more implementations.

FIG. 5 describes example procedures 500 for using crowd-sourced information to automatically expose settings and tools in accordance with one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations, the procedures may be performed in a digital medium environment by a suitably configured user computing device, such as the example computing device 102 of FIG. 1 that makes use of a document viewing application 109, such as that described above.

In one or more implementations, a document is received (block 502) and an application, such as a document viewing application, ascertains whether crowd-sourced information exists for the document (block 504). This procedure can be performed in any suitable way. For example, when a link to a particular document is received, the application can use the link as a basis to make a request to a service provider as to whether any crowd-sourced information exists. Alternately or additionally, when a user opens a document, the act of opening the document can trigger a request to the service provider. The request can include a document ID, page number, content ID (e.g., for an image), and device type or model. If, at block 506, crowd-sourced information is ascertained to exist, the crowd-sourced settings and/or tools information is received (block 508) and automatically applied to the document (block 510). It is to be appreciated and understood that in some implementations, crowd-sourced information can be utilized for the same device type or similar device types. For example, devices can be considered as similar if they have comparably sized displays or form factors. In addition, a threshold-based approach can be utilized, as described above. So, for example, if a particular zoom level has been used for a particular page by a threshold number of users, e.g., 75 percent or more, then the zoom level used by a threshold number of users can be automatically applied to the document when the document is opened. Similarly, if a common set of tools are ascertained to have been used for particular document, page, or content on a same or similar device, these tools can be automatically exposed to the user.

Returning to block 506, if crowd-sourced information does not exist, settings and tools information is collected (block 512) from the user's interaction with the document and transmitted to the service provider (block 514). This information will now be consolidated by the service provider and subsequently used. Recall from the discussion of FIG. 2, that the information collected and transmitted to the service provider can include a document ID, page number, content type, setting/tool parameter, and device characteristics.

Having described example procedures in accordance with one or more implementations, consider now an example system and device that can be utilized to implement the various techniques described herein.

Example System and Device

Figure 6:
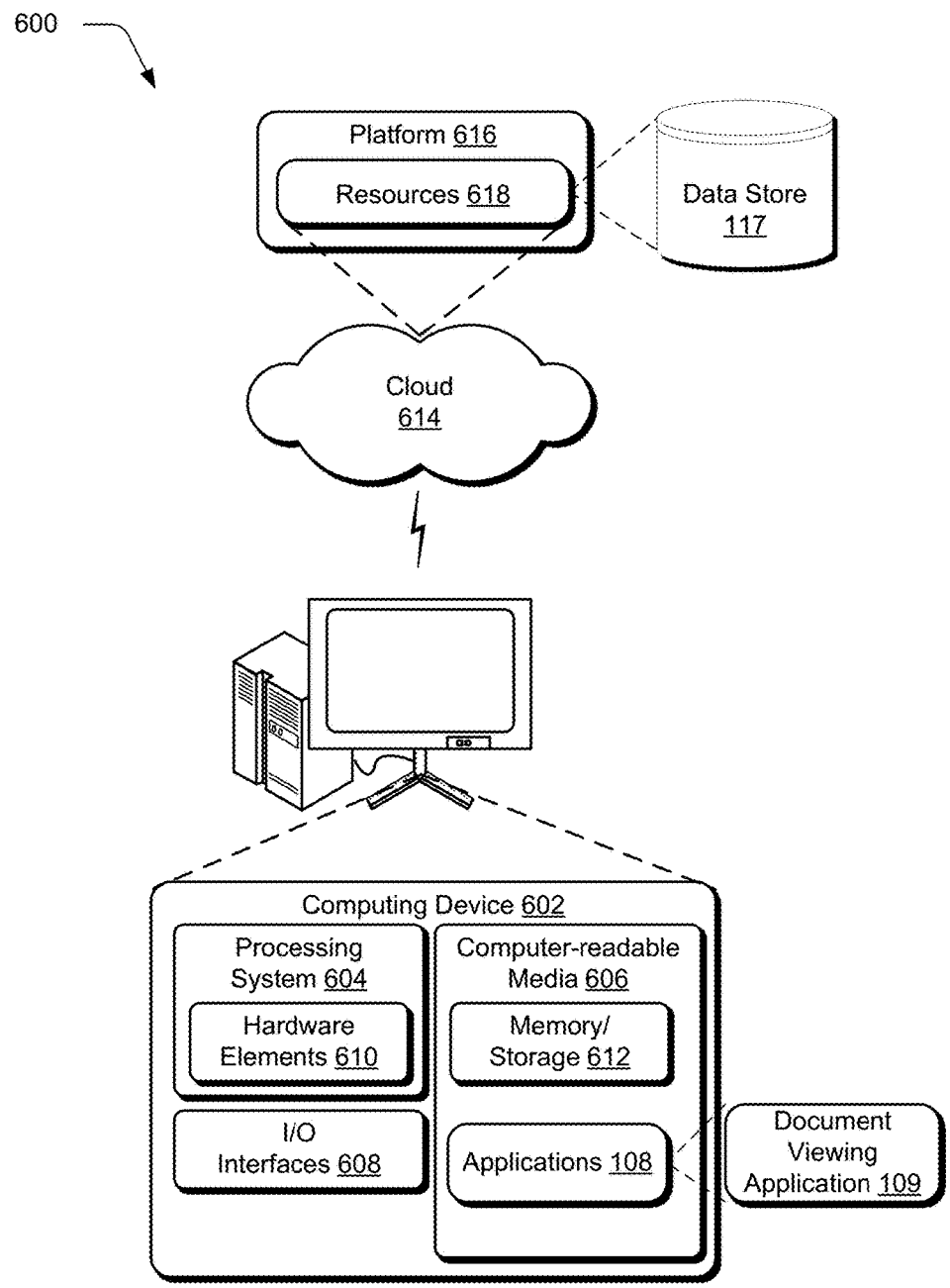
FIG. 6 illustrates an example system including various components of an example device that can be employed for one or more search implementations described herein.

FIG. 6 illustrates an example system generally at 600 that includes an example computing device 602 that is representative of one or more computing systems and/or devices that may implement the various techniques described herein. This is illustrated through inclusion of the document viewing application 109, which operates as described above. The computing device 602 may be, for example, a server of a service provider, a device associated with a client (e.g., a client device), an on-chip system, and/or any other suitable computing device or computing system.

The example computing device 602 is illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

Conclusion

In one or more implementations, a digital medium environment includes a computing device that is configured to use a document viewing application that includes a user interface to enable a user to view a document. One or more computer-readable storage media comprise instructions that are stored thereon that, responsive to execution by the computing device, receive, via the document viewing application, a document that has been shared with multiple users. The document viewing application ascertains whether crowd-sourced information exists for the document. The crowd-sourced information pertains to one or more of commonly used settings or tools, e.g., a zoom setting, that have been used on the document by the multiple users. If crowd-sourced information exists, the crowd-sourced information is received and automatically applied to the document, e.g., by automatically zooming the document to the commonly used zoom setting or displaying a toolbar with commonly used tools. If crowd-sourced information does not exist, settings and tools information associated with interaction with the document is collected and transmitted to a service provider.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment including a computing device having a service provider that collects information for improving a user's document interaction, a method implemented by the computing device, the method comprising:
   receiving crowd-sourced information regarding document interaction by multiple users interacting with a document that has a document ID, the crowd-sourced information pertaining to settings or tools that are used by the multiple users on the document and including device characteristics associated with devices used to interact with the document;
   storing the crowd-sourced information in a data structure that identifies, for individual device types based on the device characteristics, settings or tools that were used to interact with the document;
   receiving, from a user computing device, a communication that includes a document ID and one or more device characteristics associated with the user computing device;
   based on the document ID and the one or more device characteristics, ascertaining, for a corresponding device type, one or more of settings or tools that are used by the multiple users from the multiple users' interaction patterns with the document; and causing the ascertained one or more of settings or tools to be automatically exposed by way of a document viewing application executing on the user computing device.

2. A method as described in claim 1, wherein said ascertaining is performed by ascertaining one or more of settings or tools that are used at a document level.

3. A method as described in claim 1, wherein said ascertaining is performed by ascertaining one or more of settings or tools that are used at a page level.

4. A method as described in claim 1, wherein said ascertaining is performed by ascertaining one or more of settings or tools that are used at a content level.

5. A method as described in claim 1, wherein said ascertaining comprises ascertaining one or more of settings or tools that constitute commonly used settings or tools that are used by a threshold number of users.

6. A method as described in claim 1, wherein said causing is performed by communicating the one or more of settings or tools that are to be exposed to the user computing device separate from communicating the document to the user computing device.

7. A method as described in claim 1, wherein one setting comprises a zoom level.

8. In a digital medium environment in which a computing device is configured to use a document viewing application that includes a user interface to enable a user to view a document, one or more computer-readable storage media comprising instructions that are stored thereon that, responsive to execution by the computing device, perform operations comprising:

receiving, via the document viewing application, a document that has been shared with multiple users;

ascertaining whether crowd-sourced information exists for the document, the crowd-sourced information pertaining to one or more of settings or tools that have been used on the document by the multiple users and including device characteristics associated with devices used to interact with the document;

responsive to crowd-sourced information existing for the document:

receiving the crowd-sourced information including the device characteristics associated with devices used to interact with the document;

ascertaining for the document at least one of the one or more settings or tools that are associated with device characteristics corresponding to the device characteristics of the computing device; and automatically applying the crowd-sourced information to the document to expose the at least one of the one or more of settings or tools.

9. The one or more computer-readable storage media of claim 8, the operations further comprising determining whether crowd-sourced information exists based on making a request to the service provider as to whether any crowd-sourced information exists, and responsive to crowd-sourced information not existing for the document:

collecting settings and tools information associated with interaction with the document; and transmitting the crowd sourced information to a service provider.

10. The one or more computer-readable storage media of claim 8, wherein the device characteristics corresponding to the device characteristics of the computing device are device characteristics associated with a same device or a similar device.

11. The one or more computer-readable storage media of claim 8, wherein the one or more of settings or tools comprises a zoom level.

12. The one or more computer-readable storage media of claim 8, wherein crowd-sourced information exists if a threshold number of users have used one or more of settings or tools.

13. The one or more computer-readable storage media of claim 8, wherein said ascertaining comprises ascertaining whether crowd-sourced information exists at a document level, a page level, or a content level.

14. A system implemented in a digital medium environment including a computing device configured to improve a user's document interaction, the system comprising:

a processing system;

one or more computer readable storage media;

a document viewing application stored on the one or more computer readable storage media and executable by the processing system which, when executed, is configured to:

receive a document that has been shared with multiple users that includes crowd-sourced information describing interaction patterns of the multiple users with the document, the crowd-sourced information including multiple collections of default settings or tools for use with the document;

select a collection of default settings or tools from the multiple collections of default settings or tools based on device characteristics of the computing device; and automatically expose, via a user interface, one or more of settings or tools from the selected collection of default settings or tools.

15. The system as described in claim 14, wherein the document viewing application is configured to automatically expose the one or more of settings or tools at a document level.

16. The system as described in claim 14, wherein the document viewing application is configured to automatically expose the one or more of settings or tools at a page level.

17. The system as described in claim 14, wherein the document viewing application is configured to automatically expose the one or more of settings or tools at a content level.

18. The system as described in claim 14, wherein the one or more of settings or tools comprises a zoom level.

19. The system as described in claim 14, wherein the document viewing application is configured to receive the document, and then automatically expose the one or more of settings or tools responsive to communication with a service provider to ascertain which settings or tools are to be automatically exposed.

20. The system as described in claim 14, wherein the document viewing application is configured to automatically expose the one or more of settings or tools at a document level, page level and content level.

* * * * *